June 20, 1967 J. I. KOTTER ETAL 3,325,880
METHOD OF MAKING A FIBER PROCESSING CYLINDER
Filed Oct. 1, 1964 2 Sheets-Sheet 1

INVENTORS
JAMES I. KOTTER
EUGENE F. WALLACE
HAROLD L. SALAUN, JR.

BY R. Hoffman
ATTORNEY

June 20, 1967   J. I. KOTTER ETAL   3,325,880
METHOD OF MAKING A FIBER PROCESSING CYLINDER
Filed Oct. 1, 1964   2 Sheets-Sheet 2

INVENTORS
JAMES I. KOTTER
EUGENE F. WALLACE
HAROLD L. SALAUN, JR.

BY R. Hoffman
ATTORNEY

United States Patent Office 3,325,880
Patented June 20, 1967

3,325,880
METHOD OF MAKING A FIBER PROCESSING CYLINDER
James I. Kotter, Metairie, Eugene F. Wallace, Chalmette, and Harold L. Salaun, Jr., Metairie, La., assignors to the United States of America as represented by the Secretary of Agriculture
Filed Oct. 1, 1964, Ser. No. 400,967
1 Claim. (Cl. 29—148.4)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel method for assembling the working surface and the associated tooth or pin components of fiber processing cylinders and has as its objective simplification of both the construction and the maintenance of these cylinders.

It is well known to those familiar with the art of fiber processing that the majority of processing machines employ pinned or toothed cylinders which cylinders perform a variety of functions, such as extracting tufts from fibrous masses, opening, separating, and holding fibers as in the cleaning operation, conveying, doffing, and the like. It is further known that in spite of precautionary measures, such as magnetic traps, it happens occasionally that bale straps, buckles, clamps, or other foreign materials inadvertently get into processing equipment, and cause damage to the machines, especially to the teeth of the processing cylinders. This occurrence is most common in machines used in the opening, blending, and cleaning operations of textile processing.

The prior art is replete with attempts to provide the industry with processing cylinders clothed with replaceable teeth or pins but these attempts have not met with marked success either because of high initial cost, construction impracticability, or both.

Fiber processing cylinders assembled according to the method of this invention provide an efficient and economical arrangement by which processing cylinders can incorporate easily replaceable pins or teeth and accordingly fiber processing cylinders assembled by the method of this invention provide for the possibility of interchanging and/or varying tooth configuration of the cylinder without incurring the cost of cylinder replacement.

These and other objects that will be apparent to those skilled in the art are achieved by our invention.

A fiber processing cylinder assembled according to the invention is described below and is depicted in the accompanying drawings where:

Figure 1:
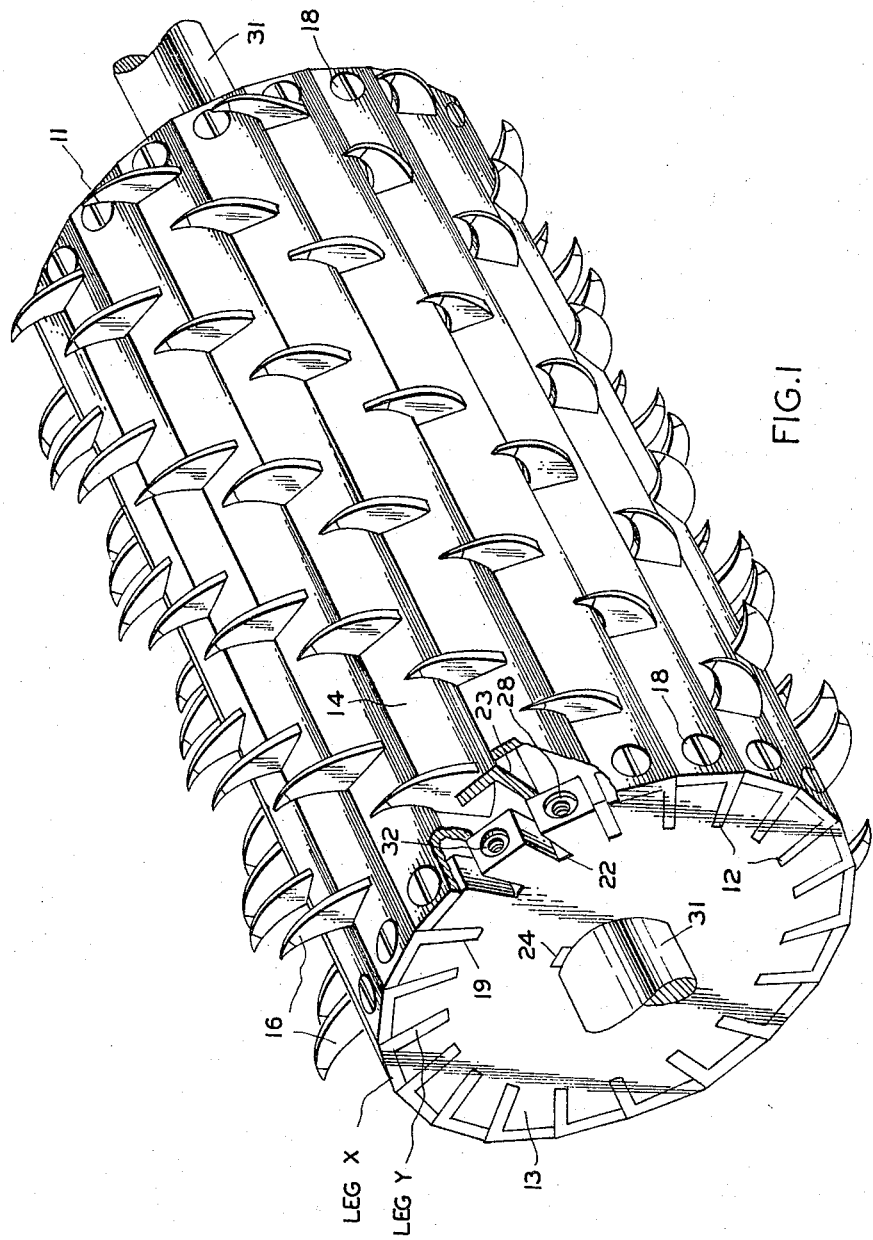
FIGURE 1 is a pictorial view of a cylinder assembled according to the invention. A portion of the cylinder has been broken away to show construction.
Figure 3:
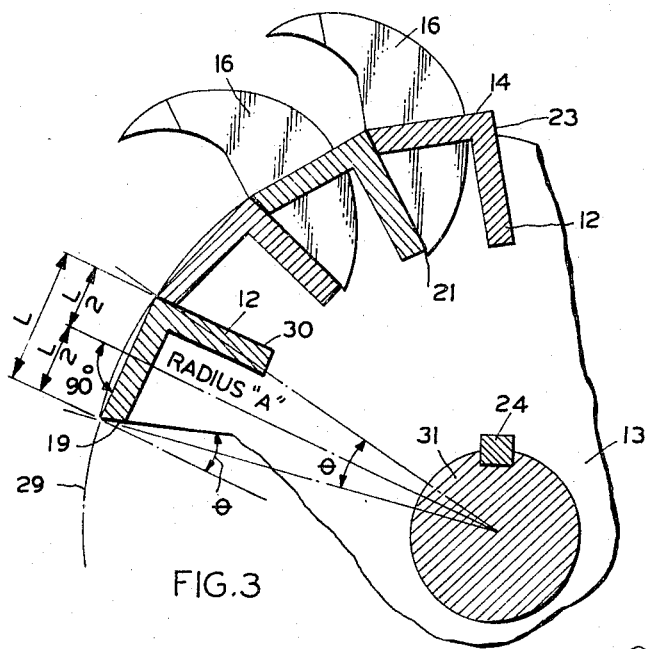
FIGURE 3 is a multiple section end view in part of the processing cylinder.
Figure 2:
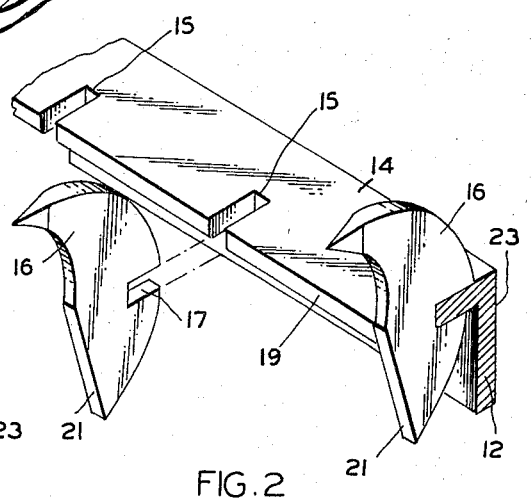
FIGURE 2 is a pictorial view showing construction details of a typical angular slat (angle iron) and the associated hooked pins or teeth.
Figure 4:
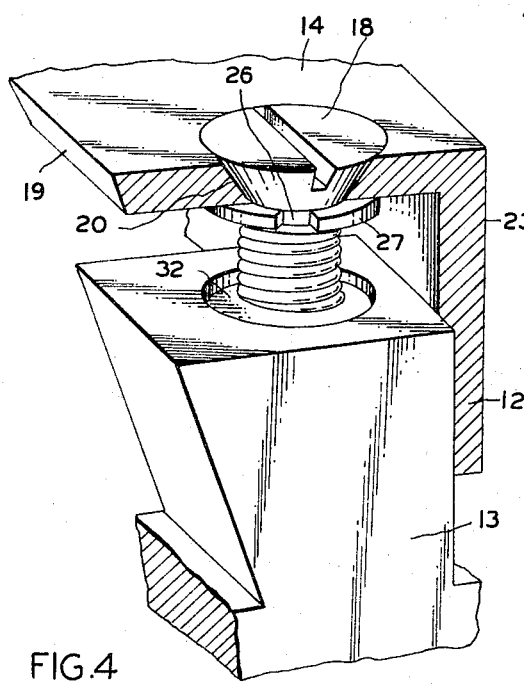
FIGURE 4 is an exploded pictorial view of a typical angular slat component fastening means that may be used in the cylinder construction.

Referring to the drawings, the processing cylinder 11 is made up of a plurality of uniform length and uniform shape angular slats 12 of any desired length. The individual lengths are inserted and mounted onto an appropriate cylinder surface support means. The cylinder surface support means may advantageously be any appropriate number of support members 13 which have the requisite regular polygonal shape. When assembled, the flat leg face surfaces 14 of the angular slats 12 become chord segments which in sum when viewed in place and in cross-section form a regular polygon, the flat surfaces in turn define the working surface of the processing cylinder 11. Surface 14 which is a flat leg face of an angular slat 12 is provided with a plurality of slotted openings 15. Hooked pins or teeth 16 with slots 17 are inserted into the slotted openings 15.

Each flat leg face of an angular slat 12 is slotted and the leading edge of said flat leg face surface 14 is beveled at edge 19. Correspondingly, each hooked tooth or pin 16 has a beveled edge 21 which is equal in inclination to the bevel at edge 19 on angular slat 12.

The number of angular slats 12 used in the construction of cylinder 11 determines the angle of inclination of the bevel. Thus, for example, the bevel angle=360°/n, where n is the number of leg faces which define the working surface.

To assemble processing cylinder 11, teeth 16 are inserted into slotted openings 15 and moved rearward until the beveled edges 21 of the teeth 16 are in line with the beveled edge 19 of the angular slat. This results in the formation of a continuous bevel along the entire length of angular slots 12. The angular slots 12 with their hooked teeth 16 are then secured to the support means 13. The support members 13 may advantageously contain slots 22 which slots accommodate one leg of each angular slat. The angular slats 12 are fastened to the support means 13 by bolts 18 fitted into tapped holes 28.

When assembled, the hooked teeth or pins are held securely in place by the wedging action that occurs between beveled edge 21 of a tooth and edge 23 of each angular slat 12. Each angular slat 12 is held in place by the action of beveled edge 19 of one slat wedging against rear edge 23 of adjacent slat as slats 12 are fastened to support disks 13 by bolts 18.

Each slot 22 of a support member 13 is parallel to construction radius A and each outer flat surface 14 of slat 12 is perpendicular to radius A. Also, each rear edge 30 of each slot 22 is located at a distance from radius A equal to half the width of outer flat surface 14 of each angular slat 12.

The cylinder surface support members 13 are locked to a supporting shaft 31 by a conventional means such as a standard key 24.

Although hooked teeth are shown in the preferred embodiment of the invention, straight pins (inclined or vertically mounted) or any other type of pin or tooth used in fiber processing may be employed.

Although the invention is described using a standard angular cross-sectional configuration to form the periphery of the processing cylinder 11, it is not restricted to the use of this type configuration. Other shapes may be employed, such as the T, the channel, the Z, the flat bar, et cetera. A true cylindrical outer surface may be obtained by the use of a curved cross-sectional configuration.

Easy removal of angular slats 12 is facilitated by bolts 18 with grooves 26 fitted with clips 27 sandwiching the outer flat surface 14 of each angular slat 12 between the head of bolt 18 and the clip 27. The support disks 13 have a recess 32 at each tapped hole 28. As the bolt 18 is unscrewed, the angular slat 12 is forced outward by the clip 27. Obviously, angular slats 12 can be fastened by a conventional screw if quick removal is not needed.

We claim:
A method of assembling the working surface and associated tooth components of a fiber processing cylinder which cylinder consists of a central shaft, support means for securing the working surface with associated teeth to the central shaft, and the working surface with associated teeth; said working surface defined by the flat leg-face portions of a plurality of lengths of uniform angle iron, said lengths individually disposed adjacent and parallel, and collectively disposed axially relative the cylinder, a flat leg-face portion of each length associated with a plurality of separate, spaced, and individually removable teeth; each length secured to the support means with one leg directed toward the interior of the cylinder and the leading edge of the companion and cylinder surface defining leg-face beveled toward the cylinder center at a bevel angle defined by the relation $360°/n$, where $n$ is the number of leg faces which define the working surface, the said leading edge provided with a plurality of spaced transverse slots, each of said slots adapted to accept and accommodate precisely within its confines an individual tooth, said tooth provided with a transverse slot on the trailing edge adapted to accept an accommodate the leg-face at an edge slot base location, the forward edge of said tooth at and below its intersection with the leg-face inclined at an angle that is a continuation of the bevel angle, a leg-face leading edge slot together with a corresponding tooth slot effecting a cross-braced dove-tail joint which securely positions the tooth; the method of assembling consisting of the following sequential operations:

(a) installing individual teeth within the transverse slots along the leading edges of a pluarlity of lengths of angle iron, said lengths of angle iron beveled and slotted as set forth above, (b) securing a length of angle iron from said plurality of lengths together with the installed teeth to the support means, said length positioned on said support means as set forth above, (c) securing a successive length of angle iron from said plurality of lengths together with installed teeth to the support means, said successive length positioned adjacent and in contact with the leading and beveled edge of the prior secured length, thereby closing the edge slots of the prior secured length and locking in place the installed teeth, and (d) repeating step (c) employing successive additional lengths of angle iron from said plurality of lengths until the working surface of the cylinder is completed.

References Cited

UNITED STATES PATENTS

| | | | |
|---|---|---|---|
| 466,846 | 1/1892 | Dobson et al. | 19—98 |
| 2,150,278 | 3/1939 | Hegenbarth | 29—529 |
| 3,090,105 | 5/1963 | Gibbar et al. | 29—148.4 X |

JOHN F. CAMPBELL, *Primary Examiner.*

THOMAS H. EAGER, *Examiner.*